United States Patent Office 3,351,304
Patented Nov. 7, 1967

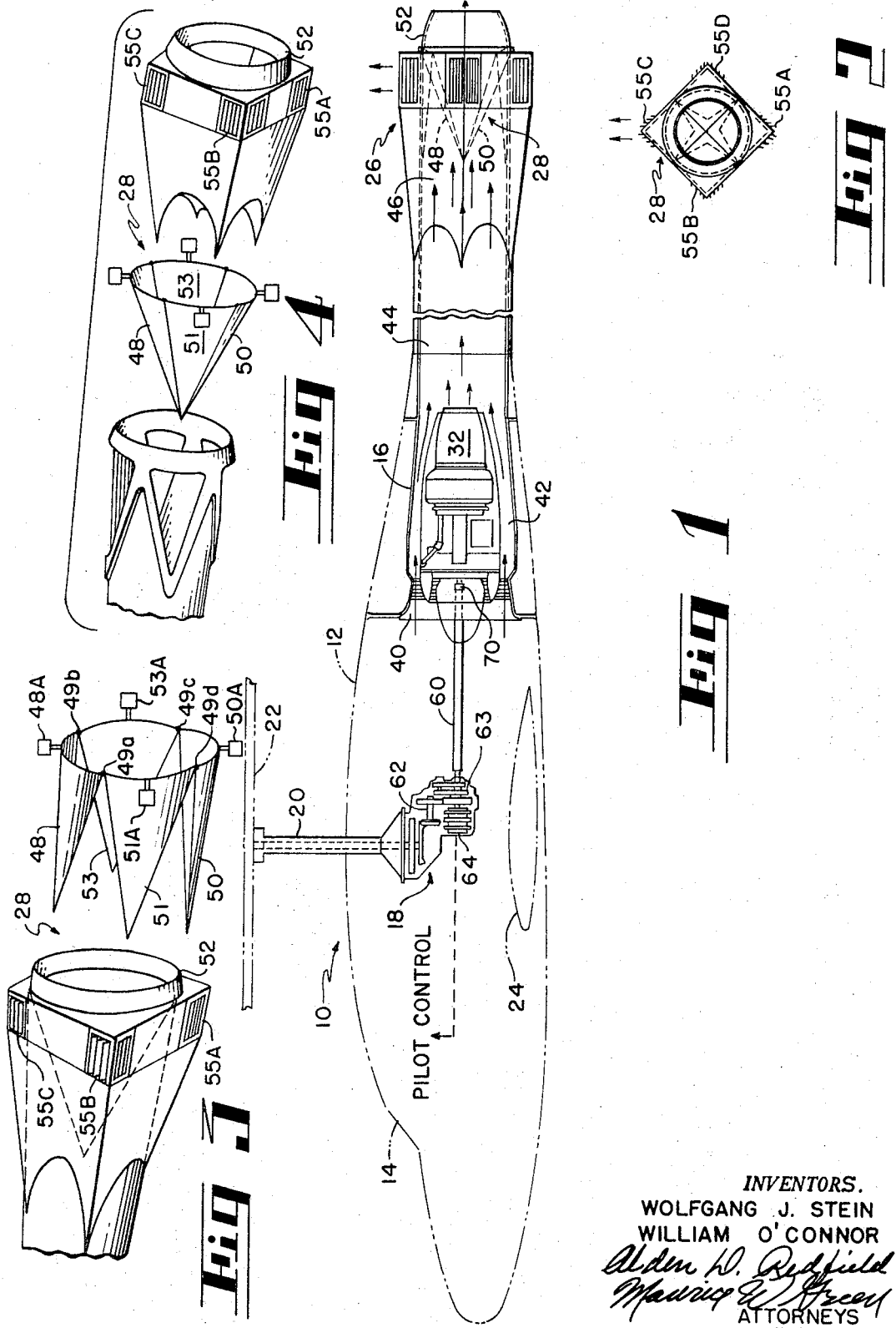

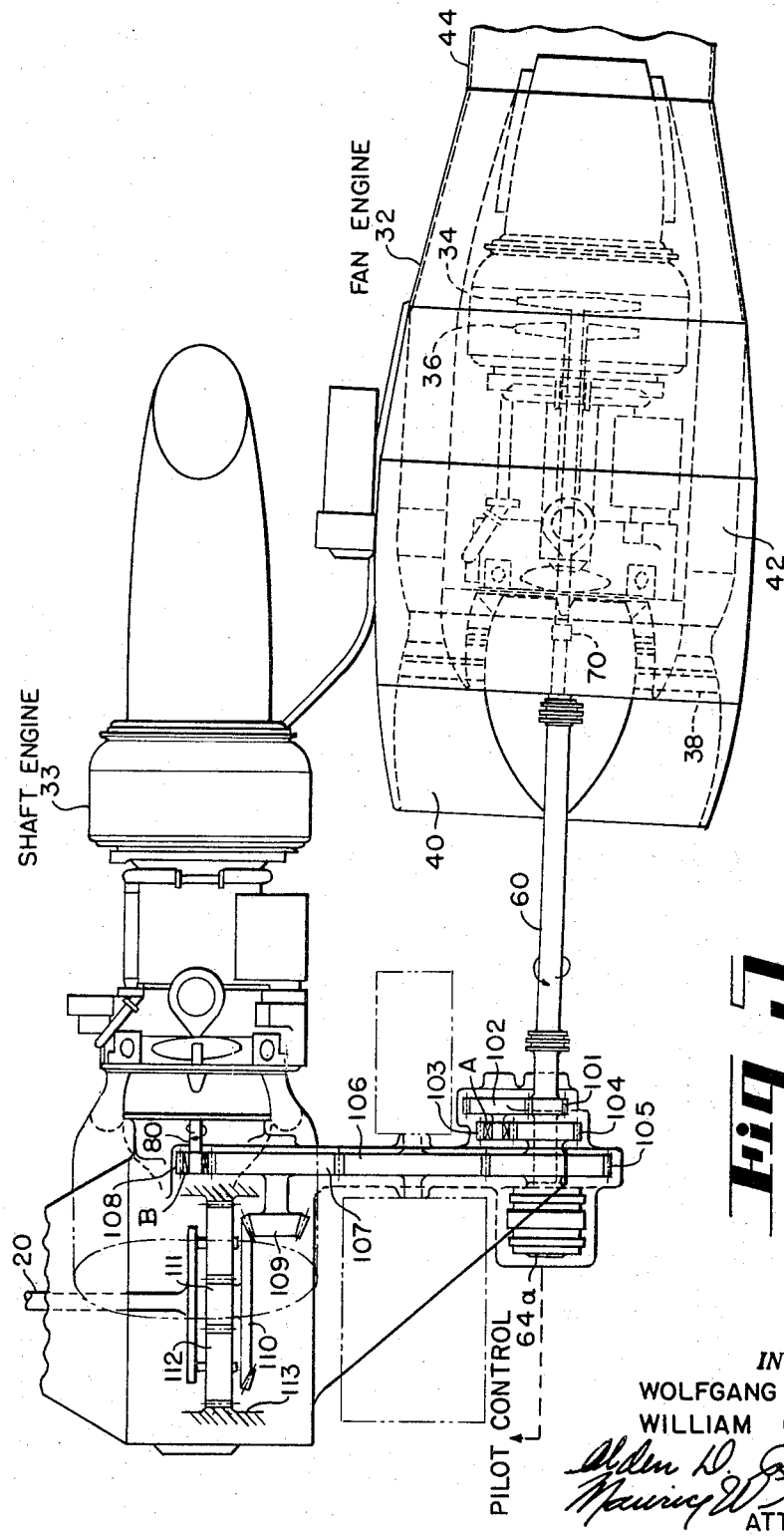

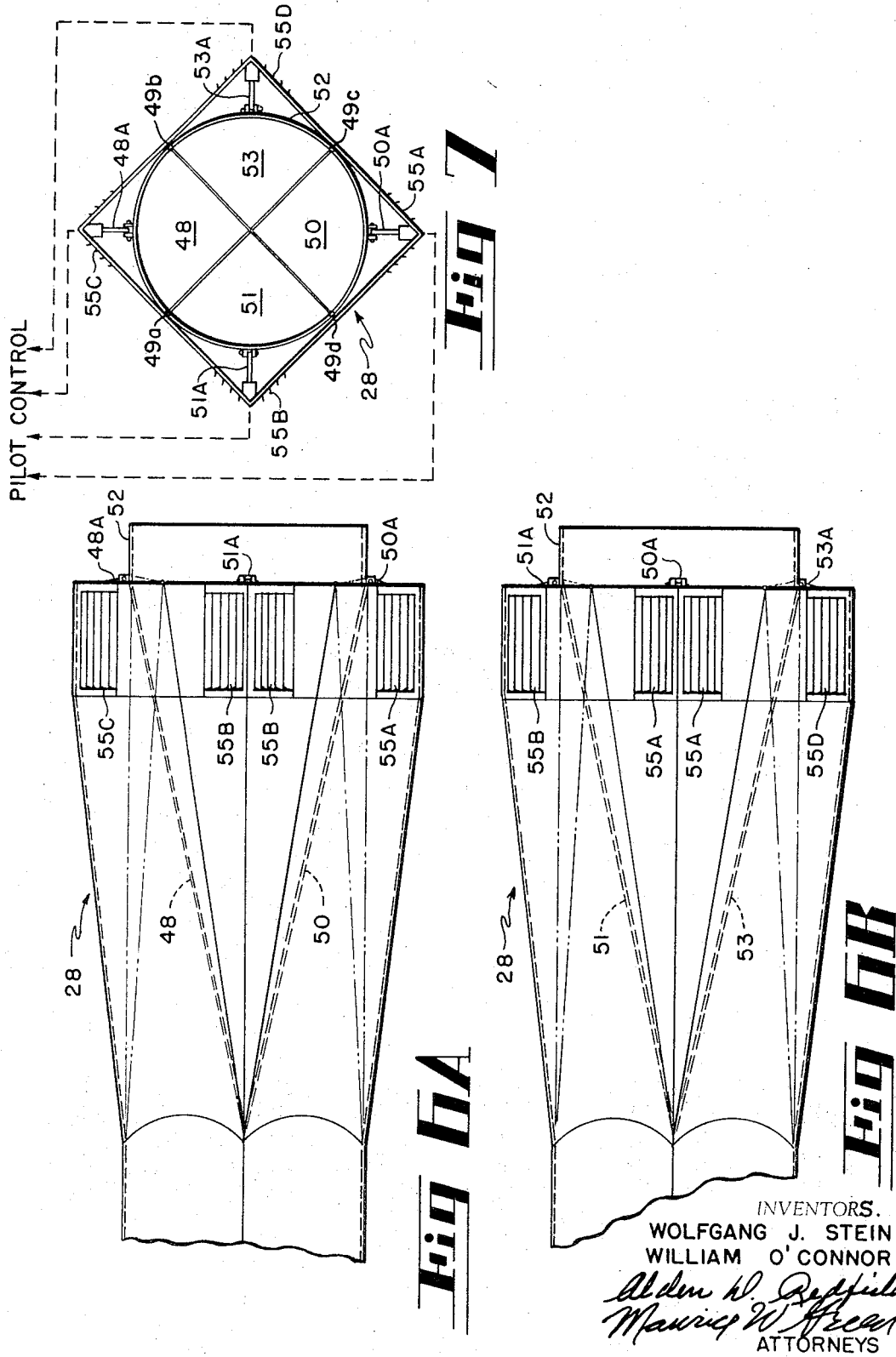

3,351,304
COMBINED VERTICAL-LIFT FORWARD-THRUST AIRCRAFT
Wolfgang J. Stein, Milford, and William O'Connor, Westport, Conn., assignors to Avco Corporation, Stratford, Conn., a corporation of Delaware
Filed Oct. 15, 1965, Ser. No. 496,611
4 Claims. (Cl. 244—17.19)

ABSTRACT OF THE DISCLOSURE

A combined vertical-lift forward-thrust aircraft, the disclosure including a helicopter rotor, a turbofan engine with combination rear control valve and rearward thrust nozzle, the control valve including lateral and vertical air deflecting valves pilot operable for in-flight control of the craft. The turbofan engine is connected to the helicopter type vertical-lift rotor by a primary gear train with reduction conforming to the requirements for helicopter flight mode with additional secondary gear train which when actuated motors the rotor at a lower r.p.m. to reduce resistance during turbofan actuated forward-thrust mode with manually operated clutch to selectively actuate primary or secondary gear reduction. An overrunning clutch located between the engine and the fan assures drive of the fan independent of engine at a speed suitable for supplying air flow to the rear valve unit thus to control the craft when power flow is from the rotor during autorotation descent with engine inactive.

A modification provides for connection of a second so-called shaft engine connected into the gear train by overrunning clutch for driving the lift rotor when input drive from the shaft engine predominates over drive coming from the turbofan engine. The primary and secondary gear train with aforesaid overrunning clutch between the fan engine and the fan affords independent rotation of the fan when the shaft engine is driving the vertical-lift rotor thus assuring air flow through the rear control valve assembly for control in either the helicopter mode or autorotation descent without either engine.

---

This invention relates to a combination vertical-lift forward-thrust type of aircraft.

It is a principal object of this invention to provide means for shifting of the rotative speed of a turbofan engine to adapt such engine for use either as a conventional turbofan forward-thrust engine or on the same aircraft to selectively provide for use of such power plant for a VTOL type of aircraft (helicopter or similar). The gearing and shifting arrangement provided permits the speed of the fan to be modulated through the gear ratios, so that in one phase of flight operation the engine is turning the fan at a low r.p.m., thereby permitting a major part of the engine power to be delivered as shaft horsepower to the rotor system, while at the same time restricting the thrust produced by the fan to a low level due to the low r.p.m.

In another phase of flight operation the gear ratio provided permits the fan engine to increase the fan r.p.m., thereby permitting the fan to produce additional thrust, while at the same time permitting limited amounts of shaft horsepower to be diverted to the rotor system to allow the rotor to be motored, to reduce drag, or to produce scheduled amounts of lift, depending on the particular characteristics of the air frame.

It is a further object to provide in the conversion of the aircraft from a turbofan propelled unit to a lift rotor type, such as helicopter, by the use of a so-called aerodynamic control valve having structure providing an outlet nozzle in the turbofan thrust mode of flight but incorporating structure in the form of valves for diverting by-passed air in directions transverse to the flight path for purposes of control.

In the by-pass fan thrust mode the entire air flow is ejected rearward through the nozzle, but on the actuation of the valves (comprising diverter elements located inside the main duct) the function of control, both in the sense of the rudder and the vertical elevator, is accomplished by diverting air in appropriate transverse directions to the line of flight.

It is a further object to provide an arrangement whereby an overriding clutch is placed in the drive connection between the fan engine and the fan, so that on descent of the helicopter-driven unit, without power, the autorotation of the helicopter rotor will drive the fan by reversing the direction of the power flow from the rotor to the fan, thereby providing a sufficient by-pass of air to the rear aerodynamic valve to provide for satisfactory control of the aircraft in such power-off descent. By the action of the overriding clutch, the fan may be rotated by the rotor system without rotating the turboengine components.

It is a further object to provide means for operation of an aircraft in several operational modes, including various combinations of lift rotor and turbofan thrust operation, which includes take-off with lift rotor actuation, various cruise and high speed modes with turbofan thrust including rotation, when desired, of the lift rotor at a low rate to reduce drag, and further, to provide means for a so-called hover mode of flight with the lift rotor actuation with sufficient fan rotation to provide control.

In a modified form of the invention the transmission structure provides for connection of two motors, one primarily designed to drive the helicopter but with interconnecting gearing. The other engine, a by-pass engine, will provide both forward thrust independent of the helicopter flight mode by the turbofan action and, further, during the helicopter flight mode will provide by-passed air for use in the aerodynamic control valve and the rotation of the helicopter rotor can be accomplished by either engine. It is also possible to actuate the helicopter rotor by one engine and to drive the fan of the turbofan engine for control with the turbofan engine entirely out of operation, other than the rotation of its fan made possible by the provision of an overriding clutch between the turbofan engine components and the fan.

FIGURE 1 is a side view partly in section and partially diagrammatic, showing the arrangement of the components of the aircraft of this invention, including gearing and shifting mechanism, the fan engine and the aerodynamic control valve, the type of aircraft being a combination VTOL convertible to fan engine thrust actuated flight mode.

FIGURE 2 is a rear view of the aircraft assembly shown in FIGURE 1, showing the diverter valve and exhaust nozzle.

FIGURE 3 is a perspective exploded view of the diverter control valve, forming a part of the empennage of the aircraft.

FIGURE 4 is an exploded view in perspective, showing three parts of the diverter valve shown in FIGURE 3.

FIGURE 5 is a side view partially diagrammatic of a gear train system of the general type shown in FIGURE 1 but modified to provide for the connection of two power plants, one power plant being a conventional helicopter drive unit and the other power plant being a fan engine of the type shown in FIG. 1.

FIGURE 6A is a side view of the diverter valve at the rear of the aircraft.

FIGURE 6B is a bottom view of the diverter valve shown in FIGURE 6A.

FIGURE 7 shows a rear view of the valve assembly with the actuating leverages for the valve parts.

Referring to the drawings and particularly to FIGURE 1, the aircraft or air frame 10 of this invention employs a fuselage 12 with forward crew compartment 14, central power plant section 16, and transmission section 18. Upwardly extending shaft 20 mounts a helicopter rotor 22. The aircraft illustrated employs low wing-supporting surfaces 24 extending laterally from the fuselage in a convention manner. The fuselage section 12 extends rearward to a rear control assembly 26 with a valve unit 28, designated generally as an aerodynamic valve.

The engine section 16 houses a turbofan type power plant, made up of a free-power turbine type gas turbine engine 32 of the general type shown in U.S. Patent 3,088,-278, with separate power turbine 34 (see FIGURE 5) and gas producer turbine 36. The power turbine 34 in this engine drives a front fan unit 38, independently rotating relative to the gas producer turbine 36, and draws air into the front fan unit through front inlet 40 into annular by-pass region 42 into an exhaust channel 44, extending rearward in the fuselage, into an exhaust channel 46 which extends rearwardly to the aerodynamic valve 28, previously mentioned.

This aerodynamic valve provides valve members 48, 50 movable from the dotted line position as shown in FIGURE 1, wherein the exhaust is directed laterally of the line of flight to position shown in FIGURE 3 where flow is rearwardly through the exhaust nozzle 52 for forward-thrust producing effect (see also FIGURES 3 and 4). When the valve members 48, 50 are in the full line position shown in FIGURE 4, the exhaust is directed outward in a direction perpendicular to the longitudinal thrust direction. Such exhaust is capable of use as a means of control by separate actuation of valve members 48, 50 to either provide for upward or downward deflection of the rear portion of the craft. Additional valves 51, 53 will control transverse vectors of flow perpendicular to the thrust direction for direction control of the aircraft.

Further detail of the control valve is shown in FIGURES 3, 4, 6A, 6B and 7, where it appears that the actuation of the valve parts 48, 50, 51 and 53 in the open position is shown in the righthand exploded portion of FIGURE 3 and will allow exhaust of the jet stream directly through the rear nozzle 52, whereas the position of the valve parts 48, 50, 51 and 53 (shown in the center portion of the exploded view of FIGURE 4) will cause the jet stream to be ejected from all of the outlets 55A, 55B, 55C and 55D, all of which outlets are shown in FIGURE 2, and such position of the valve will cause substantially equal transverse ejection in all directions. However, when it is desired to use valve members 48, 50, 51 and 53 independently, they are independently moved from the open position in FIGURE 3 to deflect a portion of the jet stream for transverse force at the rear of the aircraft. Positioning of the member 48, or selectively positioning the member 50, will given an upward or downward force by ejecting a portion of the jet stream through outlet 55C or 55A, and, likewise, actuation of either of the valves 51 or 53 will give lateral force by ejecting through openings 55B or 55D selectively. Actuating means for such results as above identified are shown in FIGURES 6A, 6B and 7, where it appears that there are connections 48A, 50A, 51A, 53A corresponding to the respective outlets for controlling the corresponding valve to that outlet to accomplish the selective control functions as above identified.

The power shaft of the fan engine 32 has a forwardly extending portion 60 which extends from the front fan of the engine to the transmission section of the craft. By provision of appropriate gear reductions 62 and hydraulically operated clutch pack assembly 64, the drive from the power shaft 60 through this transmission is reduced in speed of rotation to that sufficient to rotate the conventional helicopter rotor 22 through the upwardly extending shaft 20. Pilot operable means to actuate clutch assembly 64 as shown diagrammatically in FIGURE 1 of the drawings.

It is an important feature of this invention to connect the power shaft driven by the free-power turbine 34 to drive both the front fan 38 of the by-pass fan type turbofan engine 32 and, in addition, to connect to the same shaft a gear reduction, such as shown at 62, previously described, of sufficient reduction to rotate a VTOL type of lift-producing element, such as the helicopter rotor 22. Inasmuch as the gear reduction, so connected, will drive the helicopter rotor 22 at the desired lifting speed, the rotation of the front fan 38 will be reduced from that normally used for full forward thrust, and such reduction in rotation is more efficient because of the independence of the free-power turbine 34 from the rotation of the gas producer rotor 36. In this mode there is a conventional helicopter rotor actuation which enables the aircraft to act normally as a helicopter and the fan 38 generates a rearward movement of air through the channels 42, 44, 46, rearward to the aerodynamic valve unit 28. Such unit is controlled by conically positioned and separately actuable diverter elements, or valves, such as 48, 50, 51 and 53, and such valves can be selectively actuated, by separate control elements 48a, 50a, 51a, 53a (see FIGURE 7), to provide upward or downward control forces, or lateral forces in either direction for satisfactory torque compensation of the helicopter rotor, or for maneuvering and control of the aircraft.

Pilot operable separate control elements 48A, 50A, 51A and 53A as shown in FIGURES 3, 4, 6A, 6B and 7 may be accomplished by hydraulic elements, as shown, with separate hydraulic control lines to the pilot's compartment thereby providing manual control as shown diagrammatically in FIGURE 7. The structure shown is partially diagrammatic. As shown in FIGURES 3 and 4, the diverting valves 48, 50, 51 and 53 are operated individually by pilot control by the short stroke hydraulic elements 48A, 50A, 51A and 53A. The open and closed positions are shown in FIGURES 3 and 4, respectively. The diverting valves 48, 50, 51 and 53 are pivoted at 49A, 49B, 49C, 49D (FIGURE 3).

In selection of the gear reduction between the turbofan engine and helicopter rotor 22, the rotation of which will be in the range desired for suitable aerodynamic considerations for performance of the helicopter, rotor design, etc., the reduction is selected to place turbofan speed at a rate such that the by-pass of air to the aerodynamic valve 28 will be in the range which is suitable for actuation of that valve but substantially less in r.p.m. of the fan than is required for high thrust operation, such as occurs under high speed or cruise conditions. This ability to modulate the speed of the fan under varying conditions by selection of gear ratio and thereby to provide varying thrust through variation in the amount of air by-passed by the fan at different speeds, provides for satisfactory operation in the two modes.

If it is then desired to change the flight mode of this aircraft from a VTOL helicopter mode to a by-pass engine forward-thrust type of craft, such can be accomplished by diverting the valves 48, 50, 51 and 53 in such manner that by-pass turbofan thrust is provided for forward flight by direct ejection of the exhaust through the rear nozzle 52. This change in mode is accomplished by hydraulic actuation of the clutch pack 64 which disconnects the shaft 60 from the helicopter rotor and allows the turbofan engine unit to operate as a turbofan only, to the exclusion of gearing or rotation of the helicopter rotor 22.

An overriding clutch 70 may be located between the front fan 38 and the free-power turbine 34 so that when the helicopted rotor 22 is used as an autorotating rotor in the autorotation mode for control descent of the helicopter, without engine power, this autorotation of the rotor 22 will drive backward (i.e., from the rotor to the fan) through the shaft 60 to rotate the fan 38 by the power generated by the autorotation during descent and produce sufficient inflow of air through the passages 42, 44 and 46 and into the aerodynamic valves 28 so that the control valves thereof can be actuated for satisfactory control of the craft during descent.

OPERATION DESCRIPTION

*One engine (turbofan as shown in FIGURE 1)*

The operation of the arrangement during take-off, with the clutch pack 64 actuated to connect the shaft 60 to the helicopter rotor 22 through the gear train, drives the helicopter rotor 22 at rotative speed such as to effect take-off as in normal helicopter operation. The rotation of the fan 38 is thereby reduced by the load imposed through the gear train to the helicopter rotor 22 so that sufficient air is by-passed through the channel 44 to the valve unit 28 to enable the valve members 48, 50, 51, 53 to be manually actuated to divert such flow in either right or left horizontal direction, or up or down vertical direction, to afford the necessary controlling forces for normal helicoped operation of the craft during take-off or in continued flight in the helicopter mode of operation.

*Cruise*

The craft may continue, as above indicated, in helicopted mode operation in normal flight, but, if desired, the transition may be effected to the cruise mode by fan engine thrust by disconnecting the drive to the helicopter rotor for driving the rotor at lift speeds to drive by the separate gear train 63, whereby the rotor 22 is driven at a much lower rate required for minimum resistance to forward movement, i.e., the rotation is such as to motor the rotor 22, and such change in gear ratio will allow the turbofan engine to operate in the forward thrust mode with possibilities of major portion of the power of such engine being used to by-pass air rearwardly and out the rear nozzle 52 for greater forward speed of the craft in the turbofan mode. The valve 28 with its members 48, 50, 51 and 53 being manually actuable to control the craft in this mode by diverting a relatively small portion of such rearwardly by-passed air in directions at right angle to the line of flight for suitable control in this mode of flight.

*Landing*

In landing, the same mechanism and drive is used as in take-off, above described, namely, the fan engine is used to drive the helicopter rotor in the helicopter mode of flight with the more limited rotational speed of the the fan being sufficient to by-pass air rearwardly for use in the valve 28 at the rear of the craft. The actuation of the clutch pack 64 accomplishes this connection and the landing is therefore completed in the helicopter manner.

*Two-engine modification*

The gear arrangement, as shown in FIGURE 5, insofar as it may be operated to connect the fan engine 32 to drive the rotor shaft 20 from the output shaft 60 of the fan engine, has many of the characteristics of the gearing shown in FIGURE 1. However, the gear arrangement of FIGURE 5 has additional features, including an input shaft 80 which is considered to be driven by another engine, shown in FIGURE 5, which is primarily for the purpose of driving the rotor shaft 20 and is therefor designated as the "shaft" engine 33 in this description. The showing in FIGURE 5, therefore, is a gearing for connecting two engines, one a fan engine through the shaft 60 and a so-called shaft engine through the shaft 80. The direction of rotation of these shafts 80 and 60 is shown by arrows on the respective shafts, and it is noted that the rotation of the shaft 60 is counterclockwise looking into the gearing of FIGURE 5, while the rotation of the shaft 80 is clockwise looking in the same direction. Considering the connection of the shaft 60 and its gear trains, the shaft 60 has a gear 101 which drives a larger diameter gear 102 which in turn drives a smaller gear 103 from its central shaft through a one-way clutch A. This one-way clutch drives from the center of the gear 103 outward and considering the shaft 60 free to rotate and rotating freely in the clutch pack 64a, the gears 101, 102 and 103 will drive the gears 104 and 105 and will drive the rotor shaft 20 through the intermediate gearing 106, 107, 109 and 110 and the epicyclic gear train 111, 112 and 113. The gear 108, which meshes with 107, will rotate freely on the one-way drive clutch B and will not rotate the shaft 80, inasmuch as the one-way clutch B drives outward from the shaft 80 and, therefore, unless the shaft engine connected with the shaft 80 is driven at a sufficient speed to cause drive to come from the center of the clutch B instead of the outside, there will be no drive if the rotative speed of the engine connected to the shaft 80 is less than that coming through the gear train from the shaft 60. The gear train in operation from the shaft 60, just described, which includes the gears 102, 103 and 104, will be a ratio which will rotate the shaft 20 to the slowest rotation normally used for "motoring" the rotor shaft 20 to provide for reduction in drag at low rotative speed of the helicopter rotor during the time that the fan engine 32 is operating as a by-pass fan to drive the aircraft in the fan engine mode for cruise or high speed, as will later be described. For the purpose of providing drive where the fan engine shaft 60 is rotating at a speed which would be required to drive the rotor 22 at a lift mode, so that the aircraft is operating as a vertical-lift helicopter device, then the main clutch 64a is actuated and such actuation connects the shaft 60 with the assembly which carries the gears 104 and 105. It is noted that the diameter of the gear 104 is greater than the diameter of the gear 101 and, because of the direction of drive through the clutch A, if the clutch 64a is actuated to connect the shaft 60 with the assembly 104, 105, there will be no drive through the gear train 102, 103, as gear 103 will rotate freely relative to the inner portion of the clutch A. Therefore, when the clutch 64a is actuated for connection, the drive will be directly from the shaft 60 to the gear 105 to the gear 106, and thus through the remaining gear train to the rotor 22 at a lesser gear reduction (than when gears 102, 103 are included) and therefore rotate the rotor shaft 20 at a higher rate of rotation to provide for lift actuation. As previously mentioned, because of the direction of drive through the clutch B, the gear 108 will rotate freely around the shaft 80.

When it is desired to operate the helicopter rotor shaft 20 from the engine connected to the shaft 80, the main clutch 64a is disconnected, and assuming that the fan engine connected to the shaft 60 is rotating at a speed such that the shaft 80 will have sufficient predomination of rotation to drive through the gear 108 to the gears 107, 109, 110, 111, 112, and 113, the drive will therefore go to the rotor shaft 20. Because of the overrunning clutch A, and since the direction of drive is from the inside of clutch A to the outside, there will be no drive from the gear 103 to the gear 102 and the rotation of the shaft 60 will be free of the shaft 80.

The following table shows the relative pitch diameters of the various gears shown in the disclosure of the illustrative embodiment of the invention, such gears being shown in FIGURE 5 of the drawings.

| Gear number: | Gear diameter (units) |
|---|---|
| 101 | 4.00 |
| 102 | 6.84 |
| 103 | 4.00 |
| 104 | 6.84 |
| 105 | 14.00 |
| 106 | 15.81 |

| Gear number:—Cont. | Gear diameter (units) |
|---|---|
| 107 | 14.00 |
| 108 | 3.78 |
| 109 | 6.00 |
| 110 | 17.10 |
| 111 | 5.10 |
| 112 | 8.40 |
| 113 | 21.90 |

Considering the two engine arrangement as shown in FIGURE 5 and the general configuration of the aircraft as shown in FIGURE 1, the following modes of operation will be described as possible of accomplishment with the gear trains above set forth.

I. Take-Off—Normal:
    Shaft engine to provide 1250 HP to the rotor head;
    Fan engine to provide 930 lbs. thrust for control.

II. Take-Off—Emergency:
    In this condition the shaft engine is shut down and uncoupled. The fan engine to provide—
      (A) 900 to 1100 lbs. thrust for control;
      (B) 1250 SHP to the rotor head.

III. Cruise:
    The shaft engine shut down and uncoupled;
    The fan engine to provide—
      (A) 250 SHP to motor the rotor;
      (B) Necessary thrust for cruise.

IV. Cruise—High Speed (Dash Condition):
    Shaft engine to provide 250 HP to motor the rotor;
    Fan engine to provide maximum thrust.

V. Hover—Shaft Engine:
    In this condition the fan engine (turbomachinery section) is shut down. The fan unit is driven by the shaft engine.
    The shaft engine to provide—
      (A) 1025 HP to the rotor to hover;
      (B) 375 HP to the fan for control thrust.

VI. Landing:
    Same as Take-Off—Normal (function I)

VII. Landing—Emergency:
    Same as Take-Off—Emergency (function II)

OPERATIONAL DESCRIPTION

I. Take-Off—Normal

In this mode of operation, the shaft engine develops 1250 shaft horsepower at 18,850 r.p.m. and drives through overriding clutch B, which permits the power to be transmitted from the inner shaft 80 (engine driven) to the outer race of clutch B (to transmission). In this mode, the main clutch 64a is in "neutral" and clutch A is overriding. The fan engine operates at limited power to provide by-pass of air to the valve 28 for control of the craft.

The actual transmission of power from the shaft engine 33 to the rotor shaft 20 is effected through gears 108, 107, 109, 110, 111, 112 and 113.

Gears 106, 105, 104 and 103 are being motored by the shaft engine, shaft 80, since they are engaged with the upper section of the main spur gear train, i.e., gears 108 and 107.

Gear 103 represents the juncture of the main drive train and secondary power transmission gears 104, 103, 102, and 101. Gear 103 is equipped with the overriding clutch A which separates secondary power transmission gears 103 and 104 from 102 and 101. The driving sense of this clutch is from the inner shaft coupled to gear 102 to the outer race in gear 103.

In this mode of operation, the outer race of clutch A is being driven at a speed of 8712 r.p.m. from the main gear train and gear 104. The inner race of overriding clutch A is being driven from the fan engine 32 through gears 101 and 102 at 2544 r.p.m. Since the sense of rotation is the same and the clutch drives from the inner race to the outer race and the outer race is rotating at a greater speed than the inner race, no power can be transmitted through gear 103 during this mode of operation.

II. Take-Off—Emergency

In this mode of operation, the shaft engine, from shaft 80, is considered to be inoperative. The fan engine 32 delivers 1250 SHP and 1100 lbs. of thrust at 5090 r.p.m. Operation is similar to take-off with single fan engine unit previously described.

The 1250 SHP is transmitted directly to the main clutch 64a which is engaged and drives gear 105. The full fan engine 32 power is then transmitted from gear 105 through gears 106, 107, 109, 110, 111, 112 and 113.

Gear 108, which is the primary driving gear from shaft 80 of the shaft engine, is equipped with the overriding clutch B which permits power to be transmitted only from the inner race to the outer race. In this case then, since the shaft engine is inoperative, the outer race of clutch B simply overrides and no power is transmitted through it.

Gear 103 represents the juncture of the main drive train and the secondary power transmission gears 104, 103, 102 and 101. Gear 103 is equipped with the overriding clutch A which separates the secondary power transmission gears 103 and 104 from 102 and 101. The driving sense of this clutch A is from the inner shaft coupled to gear 102 and to the outer race in gear 103. In this mode of operation the outer race of overriding clutch A is being driven at a speed of 8555 r.p.m. from the main gear train and secondary gear 104. The inner race of the overriding clutch A is being driven from the fan engine, shaft 60, through gears 101 and 102 at 2982 r.p.m. Since the sense of rotation is the same and the clutch drives from the inner race to the outer race and the outer race is rotating at a greater speed than the inner race, no power can be transmitted through gear 103 during this mode of operation.

III. Cruise—Normal

In this mode of operation the shaft engine is shut down and cruise is, as previously described, for single fan engine. The fan engine delivers 250 SHP (to reduce rotor drag) and 95% maximum thrust for cruise at 9500 r.p.m.

The 250 SHP is transmitted through the secondary gear train gear 101 to gear 102 through the overriding clutch A in gear 103 through gear 103 to gear 104 and then to main drive gear 105. The main clutch pack 64a is in the neutral position, thus requiring all power transmission to be effected through the secondary power train gears 101, 102, 103. From gear 105 the power is then transmitted through gears 106, 107, 109, 110, 111, 112 and 113.

Gear 108, which is the primary driving gear from the shaft engine, is equipped with an overriding clutch B which permits power to be transmitted only from the inner race to the outer race. In this case then, since the shaft engine and shaft 80 are inoperative, the outer race simply overrides and no power is transmitted through it.

IV. Cruise—High Speed

In this mode of operation the shaft engine delivers 250 SHP (to reduce rotor drag) at 13,128 r.p.m. The fan engine delivers maximum thrust for high speed at 10,000 r.p.m.

The 250 SHP from the shaft engine is transmitted through the overriding clutch in gear 108 through gear 108 and in turn through gears 107, 109, 110, 111, 112 and 113.

Gears 106, 105, 104 and 103 are being motored unloaded by the shaft engine. Gears 101 and 102 are being motored by the fan engine 30 through shaft 60.

The overriding clutch A, installed in gear 103, represents the juncture of the main and secondary power trains. As previously described, this clutch drives from the inner race to the outer race. The inner race is coupled to gear 102, which means that this clutch can only transmit power when being driven by the fan engine. In this case, the outer race of this clutch is being driven at 6067 r.p.m. from the shaft engine through shaft 80. The inner race of the clutch is being driven at 5848 r.p.m. by the fan engine. Since the outer race is turning faster than the inner race, this clutch cannot transmit any power.

V. *Hover—Shaft Engine*

In this mode of operation the shaft engine develops 1400 SHP and drives both the rotor and the fan unit only from shaft 80.

To drive the rotor system, the shaft engine drives through overriding clutch B and then through gears 108, 107, 109, 110, 111, 112 and 113, at 20,000 r.p.m. This section of the drive train absorbs 1025 HP to drive the rotor at 357 r.p.m.

To drive the fan 375 HP is transmitted through gears 106 and 105 to the main clutch which is engaged and then to the fan. In this mode the overriding clutch at gear 103 overrides, having a speed of 9266 r.p.m. at the outer race and 3161 r.p.m. at the inner race. The fan unit itself is driven at 5405 r.p.m. and produces 1160 lbs. of thrust for control.

In this mode only the fan 38 of the fan engine is driven because this unit is separated from the turbomachinery section of the fan engine (here not in operation) by the use of an overriding clutch 70 that is installed between the output shaft of the planetary reduction gear and the fan, see FIGURE 5. The drive sense of this clutch is through the inner race to the outer race (to the fan unit). Thus, when the fan is being driven by the shaft engine from shaft 80 it is not possible to drive the turbomachinery section of the fan engine.

Although the invention has been described by reference to a specific illustrative structure, it is nevertheless intended that variations and modifications may be made within the scope of the following claims.

We claim:
1. In a combined vertical-lift forward-thrust aircraft, the combination:
    a turbofan engine positioned for generation of forward-thrust longitudinally of the line of flight of said aircraft;
    a bypass-fan driven by said turbofan engine and positioned to move air rearwardly for generation of said forward thrust;
    a rearwardly directed nozzle to receive air from said turbofan;
    valve mechanism adjacent said nozzle so constructed and arranged as to provide for ejection of air vertically and laterally relative to the line of flight of said aircraft for control thereof;
    pilot operable connections from said valve mechanism to manually control said valve mechanism;
    vertical-lift rotor on said aircraft;
    a primary gear train serving as a gear reduction from said turbofan engine to said vertical-lift rotor constructed and arranged to provide rotation of said vertical-lift rotor in a helicopter mode while retaining turbofan operation of said engine to generate rearward air flow for control of said aircraft in said helicopter flight mode;
    a secondary gear reduction affording a lower relative r.p.m. said lift rotor corresponding to a speed of rotation effective to produce reduction in resistance when vertical-lift is not desired;
    a clutch operable to selectively actuate said primary or said secondary gear reductions;
    a pilot operable connection for actuating said clutch.
2. Mechanism as in claim 1 in which there is provided:
    an overriding clutch connection between said turbofan engine and said fan operable on occurrence of drive from said turbofan engine to said fan and operable on occurrence of drive from said vertical-lift rotor to said fan to allow rotation of said fan independent of said turbofan engine on occurrence of emergency autorotation conditions for landing with said turbofan engine shut down, resulting in continued drive connection from said vertical-lift rotor to rotate said fan in sufficient amounts to bypass air for control of said aircraft during descent from autorotation of said vertical lift means.
3. Mechanism as in claim 2 in which there is provided:
    a second engine, so-called shaft engine;
    overrunning clutch means for connecting said shaft engine into said primary gear train so constructed and arranged as to drive the lift rotor from said shaft engine when input drive from said shaft engine predominates over drive coming from said turbofan engine;
    whereby said primary and said secondary gear train with the said overrunning clutch between said fan engine and said fan affords independent rotation of said fan when said shaft engine is driving the vertical-lift rotor thus assuring air flow through said rear control valve assembly for control in the helicopter mode with drive from said shaft engine without said turbofan engine, as well as in helicopter mode of autorotation descent without either engine.
4. Mechanism as in claim 1 in which said secondary gear reduction comprises:
    a first gear on said fan engine shaft driving a second gear of larger diameter rotating with a third gear of smaller diameter through an overriding clutch operable from the interior of said third gear, the fourth gear of larger diameter than said third gear and said first gear driven by said second gear, said first gear connected to drive said connection to said lift rotor by said clutch by connecting said fourth gear to said lift rotor drive, whereby said secondary gear reduction will be operable only on actuation of said clutch and when so operated will assure slow rotation of said lift rotor.

References Cited
UNITED STATES PATENTS

| | | | |
|---|---|---|---|
| 2,503,172 | 4/1950 | Pullin | 244—17.19 |
| 2,644,535 | 7/1953 | Kaup et al. | 170—135.75 |
| 2,723,531 | 11/1955 | Wasika et al. | 60—102 |
| 2,940,691 | 6/1960 | David | 244—12 |
| 3,026,068 | 3/1962 | Spearman | 244—52 |

JULIUS E. WEST, *Primary Examiner.*